FIG. 6D

United States Patent Office 3,276,579
Patented Oct. 4, 1966

3,276,579
APPARATUS FOR TESTING AND SORTING
ELECTRICAL COMPONENTS
Edward R. Dluzen, Chicago, Donald K. Sandmore, Oak Lawn, and Donald L. Van Erden, Bellwood, Ill., assignors to Western Electric Company, Incorporated, New York, N.Y., a corporation of New York
Filed Nov. 30, 1964, Ser. No. 414,554
20 Claims. (Cl. 209—74)

The present invention relates to an apparatus for testing and sorting electrical components, and more particularly to an apparatus for testing the tension of wiper springs of electrical wiper assemblies and the spacing of the contacts thereon, and for sorting the tested components.

An object of the invention is to provide a new apparatus for testing the tension of spring elements of electrical components.

Another object of the invention is to provide an improved apparatus for testing the spacing of contacts of electrical components.

A further object of the invention is to provide for the efficient testing of the tension of spring elements of electrical components and of the spacing of the contacts thereon and for the sorting of the tested components.

An apparatus illustrating certain aspects of the invention for testing the tension of a pair of springs secured at one end in insulated relation to each other to a hub of an electrical wiper component and for testing the spacing of contacts thereon may include a component holding fixture which is mounted on an indexible carrier for intermittent movement therewith to a plurality of stations and for limited vertical movement thereon. At a first station a wiper component is placed in the holding fixture in a normal upper position, with the wiper springs individually in contact with circuit establishing commutator brushes of the fixture.

In response to movement of the fixture to a second station, mechanism at such station is rendered effective to move the wiper component downwardly until the lower contact thereof engages a stationary feeler element of a control circuit to effect the stopping of the wiper component with the contacts positioned equidistant from and on opposite sides of a horizontal reference plane and in alignment with the end of a first gaging element which is fixedly supported in electrically insulated relation to the apparatus between the second and third stations. At the third station, ejecting mechanism is provided for removing defective components from the apparatus.

The gaging element is a metal strip adapted to fit between the pair of contacts of the wiper component and has four horizontally disposed test sections in longitudinally spaced relation to one another with two of them spaced different distances above and two spaced similar distances below the reference plane, and with sloping cam portions interconnecting the adjacent test sections and the leading end portion of the gaging element for flexing the wiper springs sequentially through predetermined distances onto the test sections.

Auxiliary control circuits associated individually with each of the test sections of the gaging element are brought by means of the commutator brushes into operative relation with the wiper springs as the latter move by the test sections. One of the upper test sections of the gaging element serves to raise the upper spring a predetermined distance above the horizontal reference plane and provide clearance for the free upward flexing of the lower spring. The arrangement is such that with the proper tension therein the lower spring will flex to a position spaced slightly from the test section, but when the tension of the lower spring exceeds a predetermined maximum value, the spring will move into engagement with the test section and complete an electrical path through the gaging element to the other wiper spring to close the auxiliary control circuit associated therewith and thereby condition one portion of a control circuit for the ejecting mechanism.

The second upper test section of the gaging element for testing the minimum tension of the lower spring is positioned so as to raise the upper spring to a predetermined level and provide clearance for the free upward flexing of the lower spring. If the lower spring has the required minimum tension it will engage the test section and close the auxiliary control circuit associated therewith and condition a portion of the control circuit, but if the lower spring does not meet the minimum tension requirement, it will not contact such test section. The tension for the maximum and the minimum values of the upper springs is similarly tested at the two lower test sections of the camming element.

In the event the wiper component does not meet the tests applied to the springs thereof as the component moves by the four test sections of the gaging element, one or more of the auxiliary circuits associated therewith condition the control circuit accordingly to effect the actuation of mechanism at the third station for the ejection of the defective component from the apparatus in response to movement of the holding fixture to the third position.

A second gaging element is mounted between the third and fourth stations and has two portions of different thicknesses for effecting the testing of the spacing between the contacts of the wiper spring component. Control circuits associated with the two portions of the second gaging element and conditioned by engagement or nonengagement of the springs with such portions cooperate with ejecting mechanism at the fourth station to effect the ejection of defective components not meeting the tests applied thereto. At the fifth station, mechanism is provided for ejecting the remaining components from the apparatus. Other mechanism is also provided at the fifth station for moving the component holding fixture to its normal upper position preparatory to the indexing of the fixture to the first station.

Other objects, advantages and novel aspects of the invention will become apparent upon consideration of the following detailed description, in conjunction with the accompanying drawings, in which.

The present apparatus is designed to test the tension of a pair of leaf springs 20 (FIGS. 8–10) of electrical components such as a wiper assembly 22 used in various types of electrical switching equipment, and to test the spacing of the contacts 24 on the ends of the springs 20.

Figure 8:
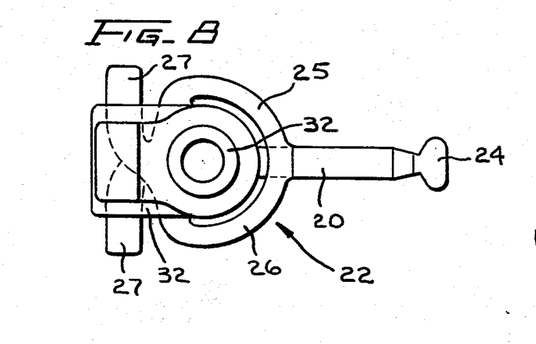
FIGS. 8 and 9 are plan and side elevational views respectively of a wiper spring assembly of the type to be tested in the present apparatus.
Figure 9:
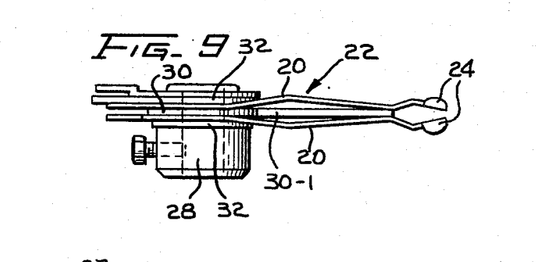
Figure 10:
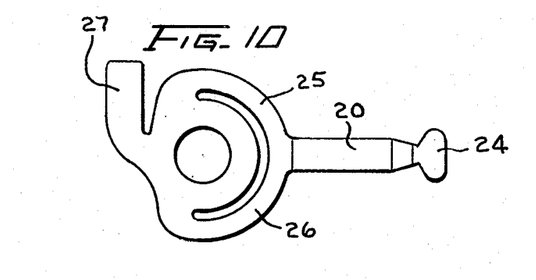
FIG. 10 is a face view of one of the wiper springs.

Each of the sheet metal wiper springs 20 has a yoke-shaped portion 25 that partially encircles and is connected to a central apertured portion 26 which in turn has a terminal 27 extending therefrom. The central apertured portions 26 of the wiper springs 20 are secured in spaced and insulated relation to each other on the reduced end portion of a tubular hub 28 with an insulating member 30 interposed therebetween to position the contacts 24 in a predetermined spaced relation to each other between the wiper springs 20 and with a pair of insulating washers 32 on opposite sides of the central portions 26 of the wiper springs and with the terminal lugs 27 extending in opposite directions. The wiper springs 22 are preformed to provide a predetermined lateral tension therein which in the wiper spring assembly urge the wiper springs toward each other in engagement with a flexible spacer portion 30–1 of the insulating member 30 and are positioned thereby with the contacts 24 spaced apart a predetermined distance which may vary within prescribed limits.

Figure 1:
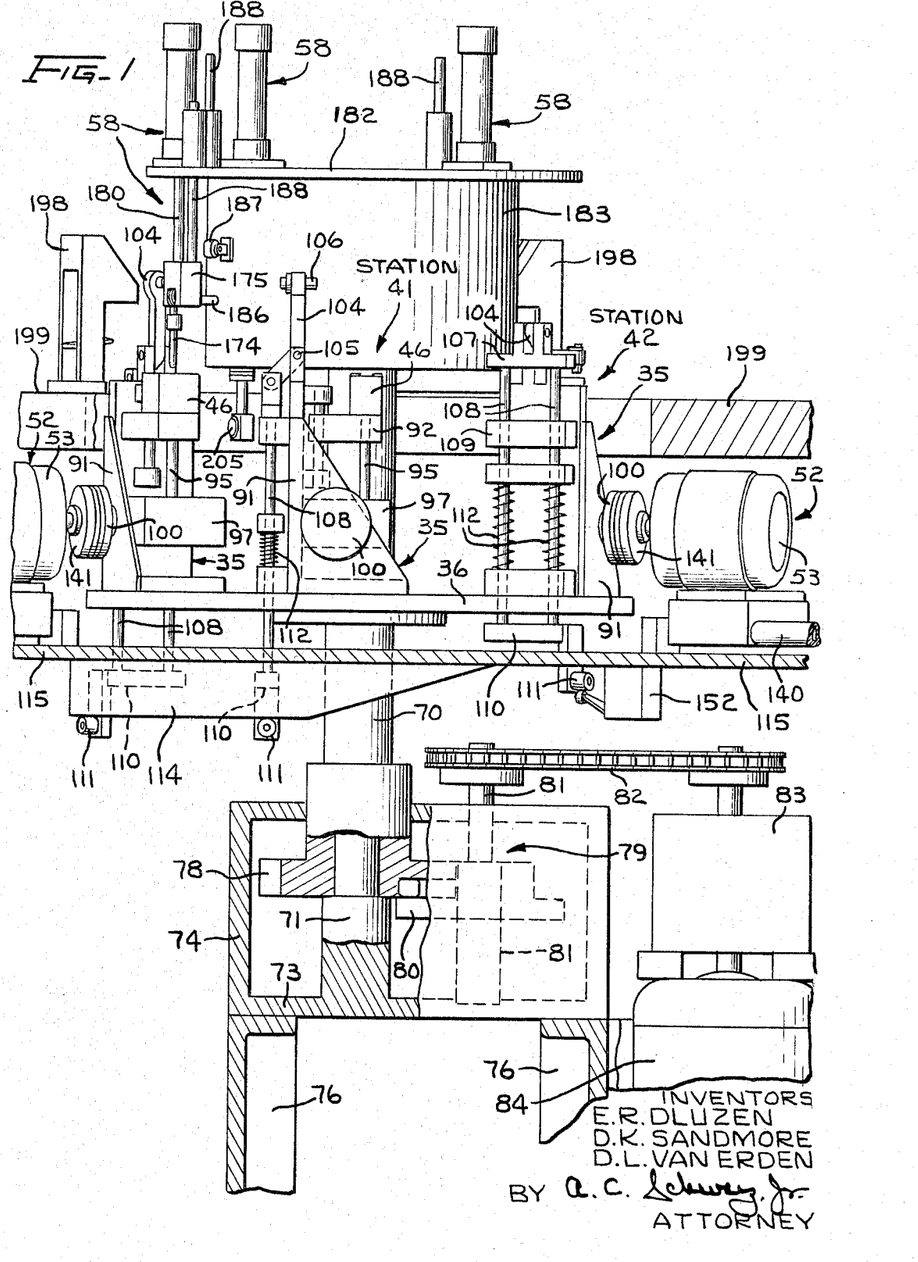
FIG. 1 is a fragmentary front elevational view of the testing apparatus embodying the present invention.
Figure 5:
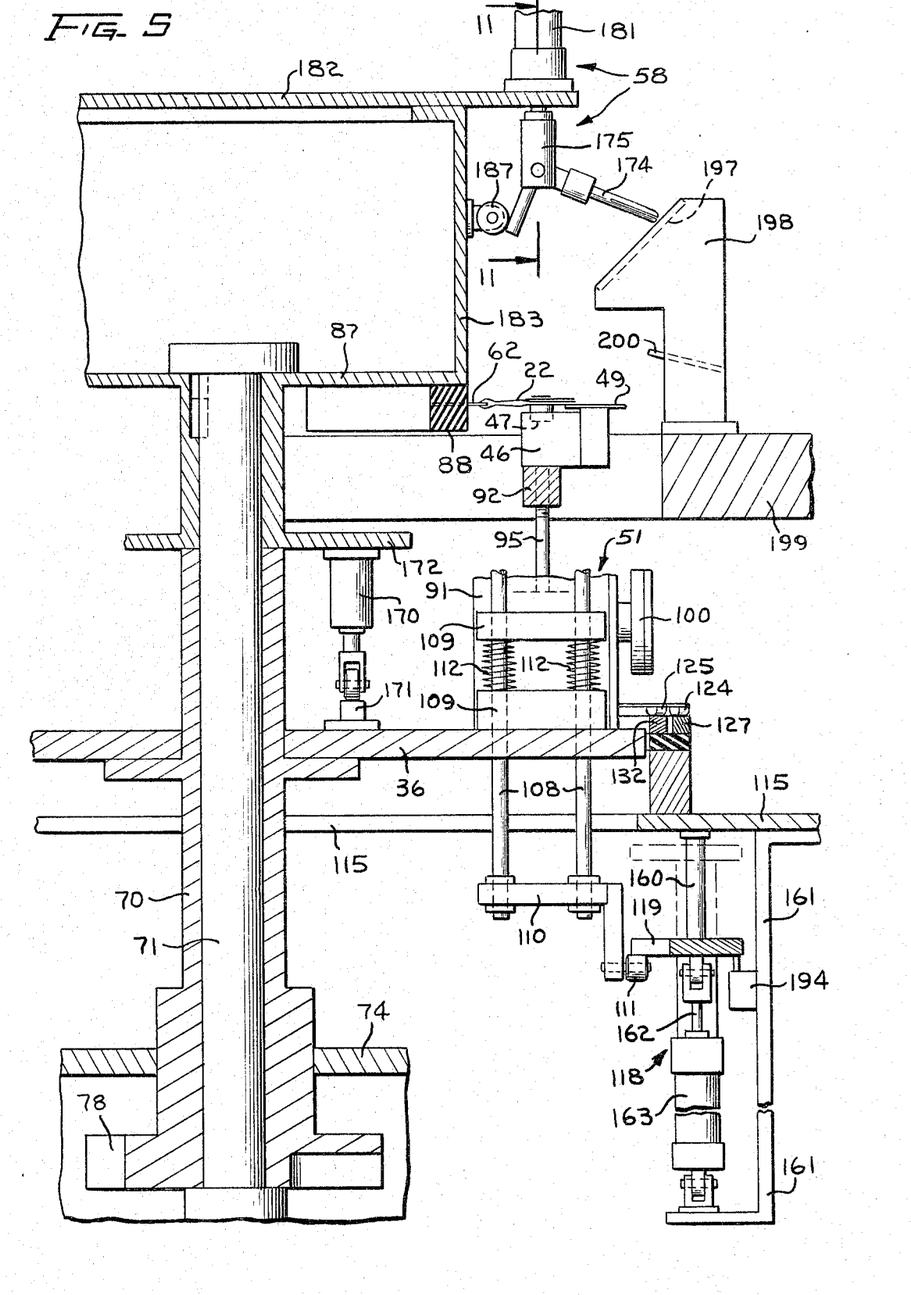
FIG. 5 is a fragmentary vertical sectional view through the apparatus taken along the line 5—5 of FIG. 2.

Generally, the apparatus comprises five wiper assembly holding fixtures 35 (FIGS. 1, 2 and 5) mounted on a carrier 36 which is intermittently rotated to advance the fixtures successively to five stations 41–45. Each of the fixtures 35 has a vertically movable holder 46 which is provided with a recessed nest 47 for receiving a wiper assembly 22 at the first or loading station 41 and for supporting the wiper assembly 22 with the wiper springs 20 disposed horizontally. The terminals 27 of the wiper assembly engage and are electrically connected to terminals 49 and 50 that are mounted on the holder 46 and are connectible sequentially with control circuits of the apparatus. In addition, each of the holding fixtures 35 includes mechanism 51 for vertically adjusting the holder 46 and the wiper assembly 22.

When the holding fixture 35 with the wiper assembly 22 therein is advanced from the loading station 41 to the second station 42, the adjusting mechanism 51 is in a position to be operated selectively by an auxiliary drive mechanism 52 including a motor 53 to effect the lowering of the wiper assembly 22 from a normal upper level and the stopping of the downward movement of the holder 46 when the contacts 24 of the wiper assembly 22 are in a predetermined position with the gap between the contacts in horizontal alignment with the leading end 55 of an elongated stationary gaging element 56 (FIGS. 2, 3, 5 and 6c).

In response to the following indexing movement of the holding fixture 35 and the wiper assembly 22 from the second station 42 to the third station 43, the contacts 24 of the wiper assembly are engaged by the gaging element 56 and the wiper springs 20 are flexed individually to various positions to test the follow-through or tension of the companion wiper spring. When one or more of the tests are not met, control circuitry is conditioned to effect the actuation of indicators for showing which tests were not met and to effect the actuation of ejecting mechanism 58 at station 43 and the ejection of the defective wiper assembly. Portions of the control circuitry is closed through the springs 20 and the gaging element 56 when the follow-through of the companion spring is such as to engage the gaging element.

A stationary gaging element 62 for testing the spacing of the contacts 24 of the wiper springs is disposed in the path of movement of the contact springs 20 of the wiper assembly 22 as it advances with the holding fixture 35 from the third station 43 to the fourth station 44. Control circuitry connectible to the wiper springs 20 during the movement of the contacts 24 past the gaging element 62 are conditioned to render ejecting mechanism 58 at the fourth station 44 operative to remove the wiper assembly 22 from the holding fixture at the station 44 in the event that the wiper assembly 22 does not meet the contact spacing tests applied thereto.

Wiper assemblies meeting the tests applied thereto are advanced from the fourth station 44 to the fifth station 45, at which latter station ejecting mechanism 58 is provided for ejecting the remaining wiper assemblies 22 from the holding fixtures 35. Auxiliary drive mechanism 52 including a motor 53 is also provided at station 45 to actuate the adjusting mechanism 51 of the holding fixture 35 to raise the holder 46 to its upper position preparatory to the movement of the holding fixture 35 to the first station 41.

Considering the apparatus in more detail, the carrier 36, which is in the form of a horizontally disposed circular table (FIGS. 1, 2, and 5), is secured to a vertically disposed hollow shaft 70 that is mounted for rotation about a vertical stationary shaft 71. The lower end of the stationary shaft 71 is formed integral with the lower wall 73 of a housing 74 that is mounted on a plurality of frame members 76 which, in turn, are supported on a suitable base (not shown). At the lower end thereof, the hollow shaft 70 is connected to a wheel 78 which is part of a Geneva drive 79 and is intermittently indexed by a rotary actuating element 80 thereof. The element 80 is secured to a drive shaft 81 which is journalled in suitable bearings in the housing 74 and is connected through a chain and sprocket connection 82 to a transmission 83 driven by a motor 84. The motor is suitably supported on one of the vertical frame members 76.

At the upper end of the stationary shaft 71 a stationary upper platform 87 is secured to which the gaging elements 56 and 62 are affixed by dielectric members 88 (FIGS. 2, 3 and 5) in the path of movement of the contact springs 20 of the wiper assemblies 22.

Each of the holding fixtures 35 includes a bracket 91 (FIGS. 1, 3–5) secured to the carrier 36. The holder 46 for supporting the wiper assembly 22 is secured to a block 92 which is slidable vertically on guide rods 93 secured to the bracket 91. The block 92 has a vertically disposed threaded aperture for receiving the threaded end portion of a vertically disposed screw shaft 95 that is connected to a worm wheel 96 and is rotatably supported in a gear housing 97 secured to the bracket 91. The worm wheel 96 meshes with a worm gear 98 which is secured to a horizontally disposed shaft 99 that is rotatably supported in the housing and has a friction clutch disc 100 secured thereto. The disc 100 forms part of a friction clutch and is selectively rotated by the auxiliary drive mechanisms 52 at stations 42 and 45 for imparting rotation to the screw shaft 95 and vertical movement to the holder 46 and the wiper assembly 22.

A clamping lever 104 (FIGS. 1, 4, 6a, and 6b) is pivotally supported intermediate its ends at 105 on the bracket 91 and has an element 106 of dielectric material secured to one end thereof for releasably retaining the wiper assembly 22 on the holder 46. The other end of the lever 104 is pivotally connected to a member 107 that is secured to the upper ends of a pair of rods 108 which are supported for vertical movement in apertured lugs 109 on the bracket 91 and are interconnected at their lower ends by a cross member 110 (FIG. 5) having a cam follower 111 secured thereto. A pair of compression springs 112 which engage collars on the rods 108, urge the rods upwardly and stress the clamping lever 104 to closed position.

A curved cam track 114 (FIGS. 1, 2 and 6b) is secured to a horizontal stationary frame plate 115 of the apparatus and has a first sloping end portion to engage the cam follower 111 and effect the movement of the clamping lever 104 to open position as the holding fixture 35 is moved from the fourth station 44 to the unloading station 45. The track has a horizontal portion to maintain the lever in such open position while the holding fixture 35 is at the unloading station 45 and at the loading station 41. A sloping portion at the other end of the cam track 114 permits the movement of the clamping lever 104 to closed position, under the influence of the springs 112, as the holding fixture 35 moves from the loading station 41 to the second station 42.

Unclamping mechanisms 118 (FIGS. 2, 5, 6a and 6b) each including a pusher element 119 are provided at stations 43 and 44 to effect the selective actuation of the clamping lever 104 from closed to open position, as will be more fully described hereinafter.

The terminals 27 of the springs 20 of the wiper assembly 22 (FIGS. 3, 4 and 6c) when supported in the holder 46 rest on and are electrically connected to the pair of terminals 49 and 50 on the holder 46 as mentioned hereinbefore. The terminals 49 and 50 of each fixture 35 are connected by flexible conductors 123 (FIG. 6c) to a pair of brushes 124, 125 which are supported on the carrier 36 (FIGS. 2 and 5) in insulated relation to each other adjacent to the holding fixture 35. The brushes are engageable with a plurality of commutator segments 127–133 (FIG. 6c) supported by a dielectric member on the horizontal frame plate 115 in the path of movement of the brushes and form a part of a control circuit as shown in FIGS. 6a–6d.

The stationary first gaging element 56 which is supported by a dielectric member 88 on the platform 87 between stations 42 and 43, as mentioned hereinbefore, is made from a strip of bronze of uniform thickness slightly greater than the distance between the contacts 24 of the wiper assembly 22 and is adapted to fit between the contacts 24, 24 of a wiper assembly and establish an electrical connection between the wiper springs 20 thereof. The flat relatively short leading end portion 55 of the gaging element 56 (FIG. 6c) is supported at a predetermined elevation parallel to a horizontal reference plane 135 passing through the center thereof.

Four longitudinally spaced, horizontally disposed test sections 56–1, 56–2, 56–3 and 56–4 of the gaging element 56 are disposed at different elevations and are interconnected with one another and with the end portion 55 by sloping portions 57. Two of the test sections 56–1, 56–2 are located predetermined different distances above the reference plane 135 for flexing the upper wiper spring 20 upwardly to predetermined positions for testing the follow-through and the tension of the lower wiper spring. The other two gaging sections 56–3, 56–4 are located predetermined different distances below the reference plane 135 for flexing the lower wiper spring 20 and for testing the follow-through and tension of the upper wiper spring as the wiper assembly 22 is advanced from station 42 to station 43.

It has been found that among the wiper assemblies 22, the position of the end portions of the wiper springs 20 and the contacts 24 thereon relative to the hub 28 may vary slightly in a direction axially of the hub. Thus, in order to subject successive wiper assemblies 22 to the precise tests prescribed, it is necessary that each of the wiper assemblies be supported in a vertical position so that the contacts 24 are disposed on opposite sides of and equidistant from the horizontal reference plane 135. Thus, after the holding fixture 35 is indexed to the second station 42, the auxiliary drive mechanism 52 is rendered operative to actuate the adjusting mechanism 51 and cause the holder 46 to be lowered until the contacts 24 on the wiper assembly are at the desired elevation.

Figure 6A:
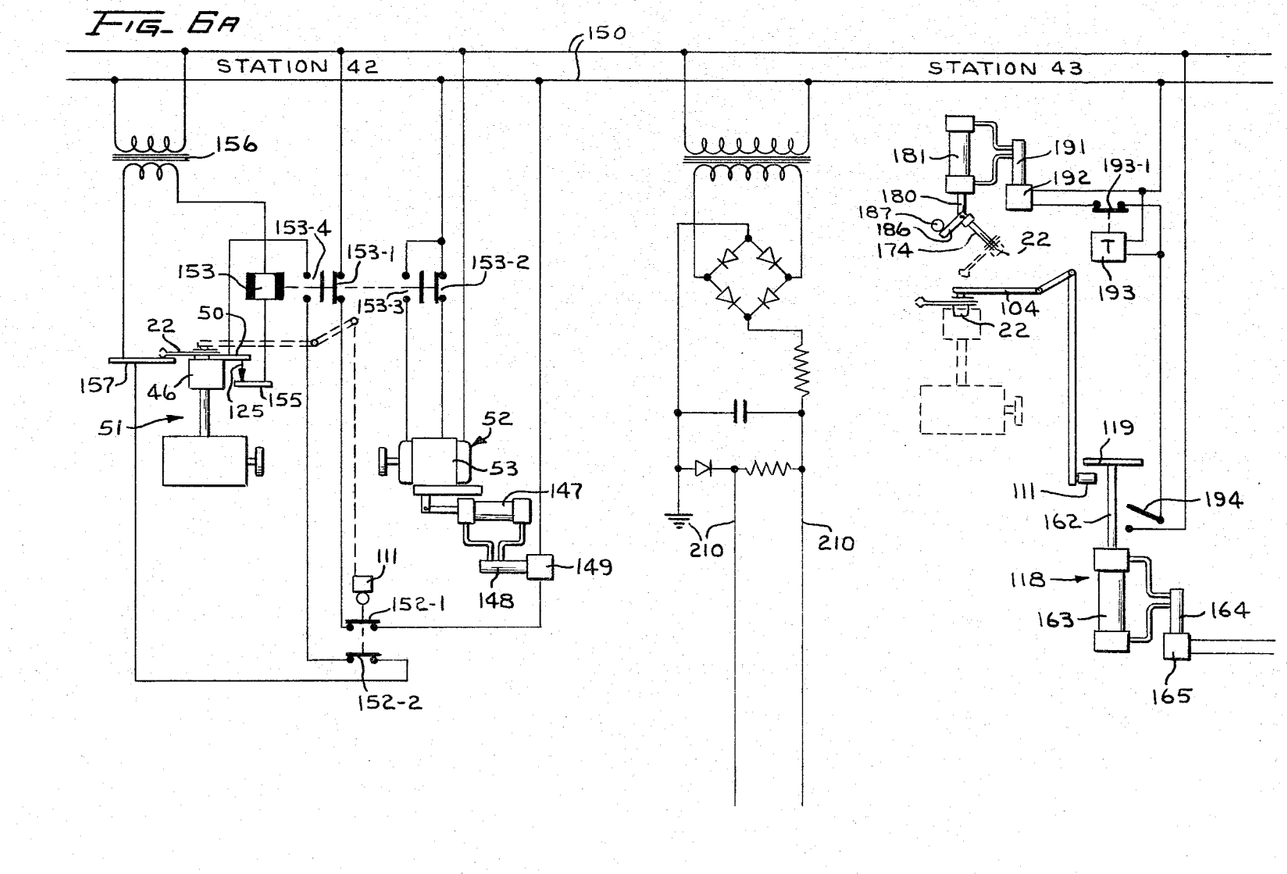
FIG. 6a, 6b, 6c and 6d comprise a diagrammatic view of some of the operating components of the apparatus and the control circuit therefor.

The motor 53 of the drive mechanism 52 is mounted on a slide 140 (FIGS. 1, 2 and 3) and has a friction clutch disc 141 engageable with the friction clutch disc 100 of the holder adjusting mechanism 51. The slide 140 is mounted for movement toward and away from the holding fixture 35 on a pair of rods 142 which are suitably supported on the horizontal frame plate 115. Reciprocatory movement is imparted to the slide 140 by a piston rod 146 of an air-operated actuator 147 which is mounted on the horizontal frame plate 115. Compressed air from a suitable source is supplied to opposite ends of the actuator 147 under control of a valve 148 (FIG. 6a). The valve has a normal condition for effecting the movement of the slide 140 and the motor 53 to the retracted position and is actuated to a second condition by a solenoid 149, when energized, to effect the movement of the slide 140 and motor 53 to the forward position and the engagement of the friction clutch discs 100 and 141.

The valve control solenoid 149 is connected to a source of power 150 in series with a normally open contact 152–1 of an interlocking switch 152 and a pair of normally closed contacts 153–1 of a motor control relay 153. The switch 152 is mounted on the underside of the horizontal frame plate 115 at the second station 42 (FIGS. 1 and 6a) in a position to be actuated to closed position by the cam follower 111 on the member 110 of the clamping lever actuating linkage when a wiper assembly 22 is present in the holder 46 of the holding fixture 35 and in response to the indexing movement of the holding fixture 35 to the second station 42.

When a wiper assembly 22 is not present in the holder 46 and the clamping lever 104 is moved to closed position, the clamping lever travels a greater distance and the cam follower 111 of the clamping lever actuating linkage is likewise moved upwardly to a higher position in which it does not actuate the switch 152 when the holding fixture 35 is indexed to the second station 42. Hence with no wiper assembly 22 in the holder 46, the holding adjusting mechanism 51 and the drive mechanism 52 therefor are not actuated.

The motor control relay 153 is electrically connected to a commutator segment 155 (FIG. 6a) at the second station 42 and is electrically connected through a brush 125, the conductor 123 (FIG. 6c), and the terminal 50 on the holder 46 to the lowermost wiper spring 20 of the wiper assembly 22 on the holder 46. The relay 153 is also connected to one end of the secondary of a transformer 156, the primary of which is connected to the power source 150. The other end of the transformer secondary is connected to a stationary conductive positioning element or terminal 157 which is supported by the dielectric member 88 on the platform 87 in the path of downward movement of the wiper springs 20 at the station 42.

Thus, in response to the movement of the holding fixture with a wiper assembly 22 therein to the second station 42, the interlock switch 152 is actuated to effect the energization of the valve control solenoid 149, the shifting of the valve 148, the operation of the actuator 147, the movement of the motor 53 to its forward position and the engagement of the clutch discs 141 and 100, and the lowering of the holder 46 with the wiper assembly 22 therein. The wiper assembly is carried downwardly with the holder 46 until the lower wiper spring 20 of the wiper assembly 22 engages the conductive positioning element 157 and thereby completes a circuit through and causes the energization of the motor control relay 153 which opens the relay contacts 153–1. This effects the de-energization of the valve control solenoid 149, the reverse operation of the actuator 147, and the disengagement of the auxiliary drive mechanism 52 and the stopping of the adjusting mechanism 51 with the holder 46 and the wiper assembly 22 properly positioned vertically relative to the leading end 55 of the gaging element 56 and with the contacts disposed equidistant from and on opposite sides of the horizontal reference plane 135.

The motor control relay 153 at station 42 also has normally closed contacts 153–2 and normally open contacts 153–3 connected in the motor circuit for transferring the power from the motor coil to a magnetic brake coil to effect the rapid stopping of the motor in response to energization of the relay 153. In addition thereto, the relay 153 has normally open contacts 153–4 which cooperate with normally open contacts 152–2 of the switch 152 to complete a holding circuit for locking in the motor control relay 153 until the wiper spring 20 is withdrawn from the conductive positioning element 157 in response to indexing of the holding fixture 35 from the second station 42 to the station 43.

In each of the unclamping mechanisms 118 at stations 43 and 44 for moving the clamping lever 104 to open position, the pusher member 119 (FIG. 5) is slidable on a pair of vertical guide rods 160 which extend downwardly from the horizontal frame plate 115 and are secured at their lower ends to a bracket 161 depending from the frame plate 115. The pusher member 119 has a normal upper position above the cam follower 111 on the member 110 of the clamping lever actuating linkage and is connected to a piston rod 162 of an air-operated actuator 163 which is supported on the bracket 161. Reciprocation of the pusher member 119 is effected by the admission of compressed air to opposite ends of the actuator 163 under control of a valve 164 (FIGS. 6a and 6b) which is shifted from a normal first position to a second position by a solenoid 165 in response to energization thereof.

The valve control solenoid 165 at station 43 is connected to a testing circuit 166 (FIGS. 6a and 6d) associated with the gaging element 56, and the valve control solenoid 165–1 at station 44 is connected to a testing circuit 167 associated with the gaging element 62. In addition thereto, the pair of valve control solenoids 165 and 165–1 are connected to the power source 150 through normally open contacts 170–1 of an interlocking switch 170 which is mounted on a flange 172 on the stationary shaft 71 (FIG. 5) and is actuated to closed position by cams 171 as the carrier 36 comes to rest after successive indexing movements. The cams 171 are individual to the holding fixtures 35 and are mounted on the carrier 36.

Figure 2:
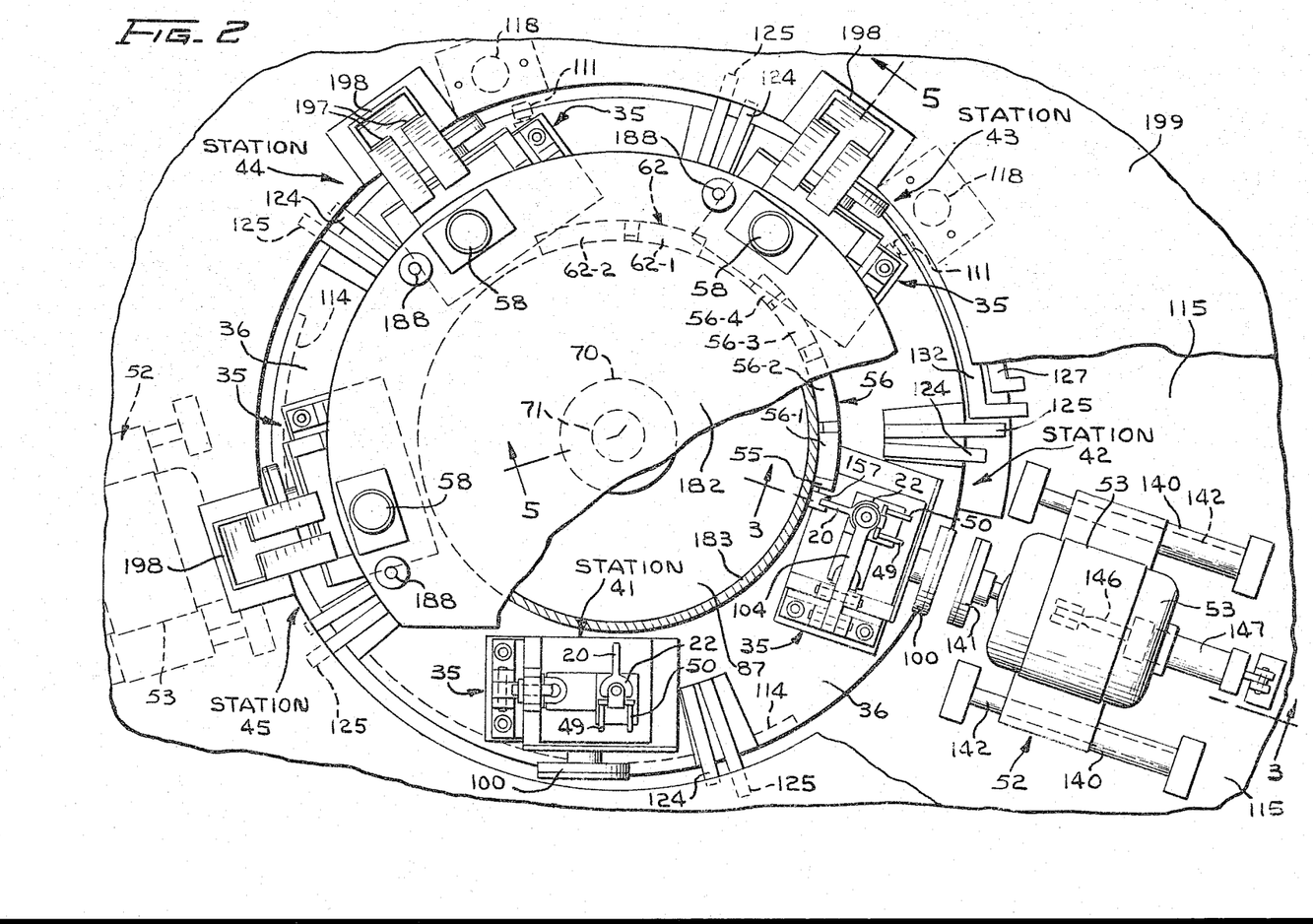
FIG. 2 is a fragmentary plan view of the apparatus.
Figures 3, 4:
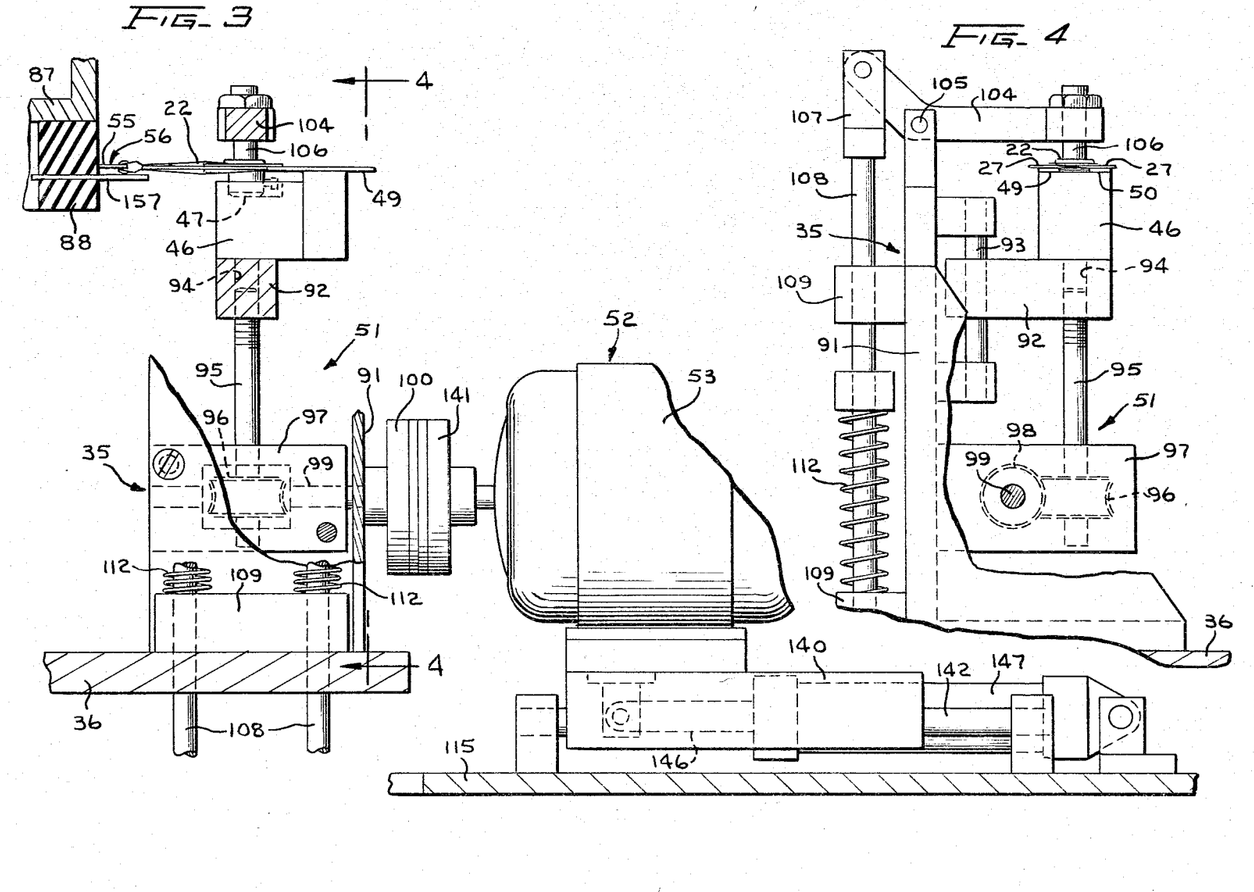
FIG. 3 is an enlarged fragmentary vertical sectional view of the apparatus taken along the line 3—3 of FIG. 2.
FIG. 4 is a fragmentary elevational view of a portion of the apparatus shown in FIG. 3 looking in the directions of the arrows 4—4 of FIG. 3.

Each of the ejecting mechanisms 58 at stations 43, 44 and 45 (FIGS. 2, 5, 11 and 12) for removing the wiper assemblies 22 from the holding fixture 35, includes a pickup finger 174 having a slotted and rounded lower end portion adapted to fit into the apertured hub 28 of the wiper assembly 22 and frictionally retain the wiper assembly thereon for upward movement therewith. The pickup finger 174 is supported on a head 175 for vertical movement therewith and for pivotal movement about a horizontal rod 176 on the head. A torsional spring 177 on the rod 176 stresses the pickup finger for rotation to a vertical position in which it is stopped by the engagement of the upper portion 178 of the pickup finger with a shoulder 179 of the head 175 and in which it is disposed in coaxial alignment with the apertured hubs 28 of the wiper assemblies 22 at such stations. The head 175 is secured to the end of a vertically disposed piston rod 180 of an air-operated actuator 181 which is supported on a horizontal upper platform 182 at stations 43, 44, 45 (FIG. 2). The upper platform 182 is suitably supported by an annular wall or frame member 183 (FIGS. 2 and 5) extending upwardly from the lower platform 87.

Extending laterally from each pickup finger 174 is a pin 186 that is engageable with a roller 187 (FIG. 5) which is fixedly supported on the annular frame member 183 and cooperates with the torsion spring 177 on the horizontally disposed rod 176 to rock the pickup finger about the rod 176 to and from a normal oblique upper position and a lower vertical position in response to vertical reciprocation of the head 175. To prevent rotation of the head 175 about the vertical axis of the piston rod 180, the head has a guide rod 188 (FIG. 11) slidable in a guideway 189 in the upper platform 182.

Figure 6B:
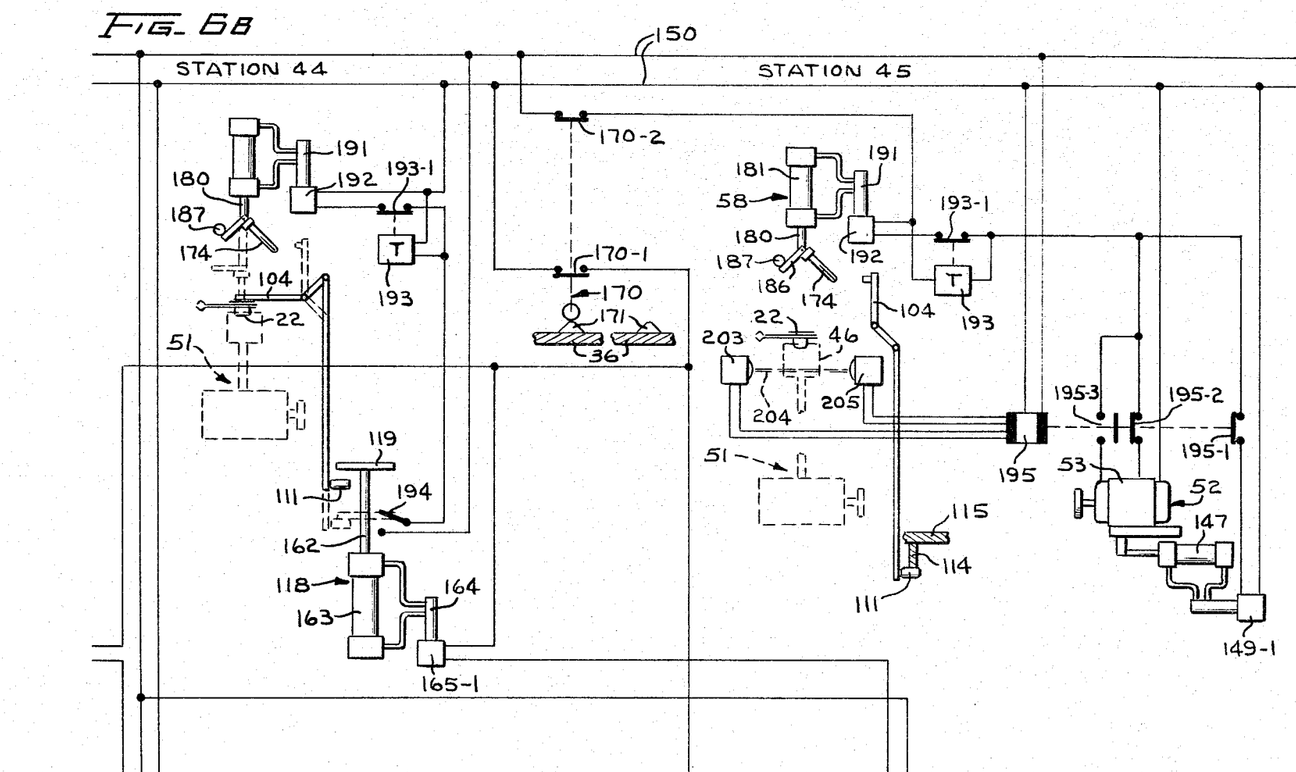

Reciprocation of the piston rod 180 and the head 175 is effected by admission of compressed air to opposite ends of the actuator 181 from a suitable supply under control of a valve 191 and a solenoid 192 (FIGS. 6a and 6b). The solenoid 192 is connected to the power source 150 in series with a pair of normally closed contacts 193–1 of a timer relay 193 which is shunted across the solenoid 192 and the timer contacts 193–1.

At stations 43 and 44, each of the valve control solenoids 192 is connected in series with a normally open switch 194 which is mounted on the bracket 161 (FIG. 5) in the path of movement of the pusher 119 and is adapted to be actuated to closed position in response to the actuation of the unclamping mechanism 118 and the movement of the pusher 119 to its lower position. At station 45 the solenoid 192 is connected in series with the timer contacts 193–1 and with contacts 195–1 of a photoelectric relay 195 which will be described more fully hereinafter.

With the solenoid 192 de-energized the valve 191 is in one position which supplies air to the bottom of the actuator 181 to effect the movement of the piston rod 180 and the pickup head 175 to the normal upper retracted position. In response to energization of the solenoid 192, the valve 191 is shifted to its other position to effect the operation of the actuator 181 and the downward movement of the head 175. As the head 175 descends the pickup finger 174, under the influence of the spring 177 and the roller 187, is pivoted about the horizontal rod 176 from an oblique position to the vertical position and the rounded end portion of the slotted pickup finger 174 enters the apertured hub 28 of the wiper assembly 22 and frictionally retains it thereon.

The timer 193 then runs out and effects the opening of the contacts 193–1 and the de-energization of the solenoid 192 and the reversal of the actuator 181. During the first portion of the upward return movement of the head 175, the pickup finger 174 moves vertically and carries the wiper assembly 22 with it from the holder 46 until the arm 186 of the pickup finger engages the roller 187. Continued upward movement of the head 175 causes the pickup finger 174 to pivot about the rod 176 and move the wiper assembly 22 laterally under and upwardly into engagement with a pair of obliquely disposed stripping plates 197 (FIGS. 2 and 5) supported in fixed and spaced relation to each other on a supporting bracket 198.

A supporting bracket 198 is mounted at each of the stations 43, 44, 45 on a horizontal table 199 which is supported by suitable frame members extending upwardly from the horizontal frame plate 115. As the pickup finger 174 is carried upwardly by the head 175 it passes between the stripper plates 197 which engage the wiper assembly 22 and remove it from the pickup finger. The wiper assembly 22 drops onto an inclined plate 200 on the supporting bracket 198 and is guided thereby into a receptacle (not shown).

At the unloading station 45 the drive mechanism 52, for effecting the reverse rotation of the screw shaft 95 and the return movement of the holder 46 to its upper position, is substantially identical to the drive mechanism 52 at the station 42 except for the control thereof. The actuator control solenoid 149–1 (FIG. 6b) for effecting the reciprocation of the drive mechanism 52 at the station 45 is connected to the power source 150 in series with normally open contacts 170–2 of the switch 170 and a pair of normally open contacts 195–1 of the photoelectric relay 195. The relay 195 is suitably supported from the table 199 and the platform 87 at the unloading station 45 and has a light source 203 (FIG. 6b) for projecting a beam of light 204 onto a photosensitive element 205 of the relay.

The holder 46 is in its lower position on the holding fixture 35 as it moves into the station 45, and intercepts the beam of light 204 from the light source 203 and thereby effects the closing of the normally open contacts 195–1 in the solenoid circuit, and the closing of the normally open contacts 195–2 and the opening of the normally closed contacts 195–3 in the circuit of the associated motor 53. As the wiper assembly holding fixture 35 is indexed to the unloading station 45, the stationary cam track 114 actuates the clamping lever 104 to its open position, and a cam 171 on the carrier 36 actuates the switch 170 to close the contacts 170–1 and 170–2 thereof.

With the closing of the contacts 170–2, the ejecting mechanism 58 at the unloading station 45 is rendered operative to effect the removal of the wiper assembly 22 from the holder 46, if a wiper assembly is present in the holder, the motor 53 is rendered operative, and the actuator 147 is rendered operative to advance the motor to its forward position into driving engagement with the adjusting mechanism 51 and thereby effect the rotation of the screw shaft 95 and the raising of the holder 46. As the holder 46 moves to a predetermined upper position it moves out of the path of the light beam 204 which acts on the light sensitive element 205 and effects the actuation of the relay 195 and the opening of the relay contacts 195–1, 195–2, and the closing of contacts 195–3 to cause the stopping of the motor 53 and the return movement thereof to its retracted position.

*Operation*

In the operation of the apparatus, a wiper assembly 22 is manually placed in the holder 46 of the holding fixture 35 at the loading station 41 during the dwell period of the carrier 36, the terminals 27 of the wiper springs 20 of the wiper assembly thus supported in the holder being electrically connected to the commutator brushes 124, 125 through the terminals 49 and 50. In response to the indexing of the carrier 36, the holding fixture 35 and the wiper assembly 22 are advanced from the loading station 41 to the second station 42, during which the clamping lever 104 is moved to closed position under the influence of the springs 112 as the cam follower 111 associated with the clamping lever rides along the sloping end portion of the stationary cam 114, and the brush 125 associated with the fixture 35 is moved into engagement with the commutator segment 155 and establishes an electrical connection between the motor control relay 153 and the lower wiper spring 20 of the wiper assembly 22.

As the cam follower 111 arrives at the second station 42, it actuates the interlocking switch 152 to closed position to effect the energization of the valve control solenoid 149, the operation of the actuator 147, the advancement of the drive motor 53 into operative engagement with the adjusting device 51, the rotation of the threaded shaft 95, and the lowering of the holder 46 and the wiper spring assembly 22 therein from the normal upper position thereof. The downward movement of the holder 46 and the wiper spring assembly 22 continues until the lower wiper spring 20 engages the conductive positioning element 157 which completes a circuit through and effects the energization of the motor control relay 153, the opening of the contacts 153–1 and 153–2, and the closing of contacts 153–3, 153–4 resulting in the stopping of rotation of the motor 53, the return movement of the motor 53 to its normal retracted position, and the locking in of the relay 153 until the lower wiper spring 20 is moved from the positioning element 157 in response to the following indexing movement of the carrier 36.

During the following indexing movement of the holding fixture 35 and the wiper spring assembly 22 from station 42 to station 43, the contacts 24 of the wiper springs 20 are moved into engagement with and longitudinally along and beyond the gaging element 56. As the wiper assembly is moved longitudinally of the gaging element 55 the end portion of the upper spring 20 is moved by the upwardly sloping portion 57 of the gaging element onto the first test section 56–1. The contact supporting end of the pretensioned lower wiper spring 20 moves upwardly toward the first test section 56–1 which is positioned to test for excessive tension of the lower wiper spring 20 and, if the tension is within the prescribed limits, the lower contact will not engage the gaging element 56–1.

If the tension of the lower spring exceeds the maximum prescribed value, the lower contact 24 will engage the test section 56–1 and a circuit will be established from a D.C. source 210 (FIG. 6a) through the commutator segment 127 (FIG. 6c), the brush 124, the conductor 123, the terminal 49, the upper wiper spring 20 and contact 24, the test section 56–1, the lower wiper spring 20 and contact 24, the terminal 50, the conductor 123, the brush 125, and the commutator segment 128 to a silicon controlled rectifier 215 and back through ground to the D.C. source 210. With the completion of the circuit through the springs 20 and the gaging element 56 a voltage is applied to the gate connection of the silicon controlled rectifier 215 (FIG. 6d) to render the latter conductive and effect the energization of a relay 216 connected in series therewith to the D.C. source 210. This effects the changing of the relay contacts 217 from a normal open position to a closed position to condition a portion of the control circuit 166 for energization of the clamping lever actuating solenoid 165 at station 43 upon the completion of the indexing movement of the carrier 36 and the closing of the interlocking switch contacts 170–1. As shown in FIGS. 6b and 6d, a signal lamp 218 is connectible to the power source 150 through normally open but now closed relay contacts 219 of the relay 216 to indicate when the test applied to the component 22 at the test section 56–1 has not been successful.

As the movement of the wiper assembly 22 continues the upper wiper spring 20 is moved onto the test section 56–2 which is positioned to test the minimum limit of tension of the lower wiper spring 20. With the proper tension in the lower wiper spring 20, the contact 24 thereof will engage the test section 56–2 which completes a circuit through the wiper springs 20 to apply a voltage to the gate connection of the silicon controlled rectifier 215–1 to render it conductive and thereby energize a relay 216–1. This causes the relay contacts 217–1 and 219–1 thereof to change from a normal closed position to an open position in the control circuit 166 for the lever unclamping solenoid 165, and the circuit for the signal light 218–1.

If the tension is below a predetermined value, the lower spring 20 will not engage the gaging element 56, the relay 216–1 will not be energized, the control circuit 166 will be conditioned for energization of the solenoid 165, the circuit for the lamp 218–1 will also be conditioned for energization of the lamp in response to closing of the interlocking switch 170 on completion of the indexing movement of the carrier 36.

As the wiper assembly 22 continues its advancing movement, the lower wiper spring 20 rides successively under and into engagement with the test sections 56–3 and 56–4 and the upper pretensioned wiper spring 20 flexes downwardly. Associated with the test sections 56–3 and 56–4 are silicon controlled devices 215–2 and 215–3, and relays 216–2 and 216–3 for controlling the relay contacts 217–2, 217–3 and 219–2, 219–3 of the control circuit 166 and the circuit for the indicating lamps 218–2, 218–3, and this portion of the control circuit operates in the testing of the upper wiper spring 20 in the same manner as described hereinabove in connection with the testing of the lower wiper spring 20.

If the wiper assembly 22 meets the tests applied thereto at the several testing sections of the gaging element 56, the relay contacts 217 to 217–3 of the control circuit 166 for the lever unclamping solenoid 165 at station 43 are in open condition, the solenoid 165 is not energized, the wiper unclamping mechanism 118 is not actuated, the clamping lever 104 remains in its closed position and the ejecting mechanism 58 is not operated. Also the lights 218 to 218–3 are not energized, thereby indicating no failures.

In the event that the wiper assembly 22 fails to meet one of tests applied thereto, the control circuit will be conditioned so as to complete a circuit to the solenoid 165 and effect its energization and thereby cause the actuation of the unclamping mechanism 118 at station 43 on completion of the indexing movement of the carrier 36, and the energization of one or more of the lights 218 to 218–3 to indicate each failure of the tests applied thereto.

During the actuation of the unclamping mechanism 118 and as the pusher member 119 approaches the end of its downward movement, it actuates the ejector control switch 194 to closed position to effect the energization of the timer relay 193, the solenoid 192, the operation of the actuator 181, and the movement of the pickup finger 174 downwardly into the apertured hub 28 of the wiper assembly 22. The timer relay 193 times out after a short interval and effects the de-energization of the solenoid 192, the reverse operation of the actuator 181, and the upward movement of the pickup finger 174 with the wiper assembly 22 and the removal of the wiper assembly from the pickup finger by the stripping plates 197.

The second gaging element 62 (FIGS. 2 and 6c) which is also supported by the dielectric member 88 beneath the platform 87 in the path of movement of the wiper springs 20, has a first relatively thin test section 62–1 of a predetermined thickness which is slightly less than the minimum acceptable spacing between the contacts 24, 24 of the wiper assembly 22, and has a second test section 62–2 of a thickness slightly greater than the maximum acceptable spacing of the contacts 24, 24. As the wiper assembly 22 is carried by the holding fixture 35 from the station 43 to the station 44, the contacts 24, 24 of the wiper assembly are moved past the first and the second test sections 62–1, 62–2, respectively, and if the contacts are properly spaced, they will not engage the first test section 62–1, but will engage the second test section 62–2.

The solenoid 165–1 associated with the unclamping mechanism 118 at the fourth station 44 is connected to the power source 150 in series with the contacts 170–1 of the interlocking switch 170 and with relay contacts 217–4, 217–5 of control relays 216–4, 216–5. The relays 216–4, 216–5 are connected to the D.C. source 210 in series with silicon controlled rectifiers 215–4 and 215–5, respectively, which in turn are connected electrically to the commutator segments 132, 133, respectively, that are associated with the first and second test sections 62–1, 62–2, respectively, of the gaging element 62.

If the contacts 24, 24 of the wiper assembly 22 do not meet the minimum spacing requirements they engage the first section 62–1 of the gaging element 62 and complete a circuit therethrough to the gate connection of the silicon controlled rectifier 215–4 to render it conductive and effect the energization of the relay 216–4 and the shifting of the relay contacts 217–4 and 219–4 from a normal open position to a closed position to condition the control circuit 167 for the lever unclamping solenoid 165–1 and to effect the energization of the light 218–4 to indicate a failure of this test.

If the wiper contacts 24 meet the minimum spacing requirements, they are not bridged by the first section 62–1 of the gaging element and the relay contacts 217–4 and 219–4 remain in their normal open condition.

If the gap between the wiper contacts 24 is greater than the acceptable maximum distance, they are not bridged by the second test section 62–2 of the gaging element 62 as the contacts 24 move therepast.

If the gap between the contacts 24 is within the maximum limits, the contacts 24, 24 will be bridged by the test section 62–2 of the gaging element and a circuit will be completed therethrough from the power source 210 through the commutator segments 127, 133, etc., to render the silicon controlled rectifier 215–5 conductive and effect the energization of the relay 216–5 and the shifting of the relay contacts 217–5, 219–5 from a normal closed position to open position.

Thus, in the event that the wiper assembly 22 does not meet all the tests applied thereto as it is moved past the gaging element 62, the control circuit 167 will be set up to effect the energization of the solenoid 165–1, and the energization of one of the lights 218–4, 218–5, on the completion of the indexing movement of the carrier 36 and the closing of the contacts 170–1 of the interlocking switch 170. The energization of the solenoid 165–1 effects the operation of the unclamping mechanism 118 and the movement of the clamping lever 104 to its open position at station 44. This, in turn, effects the closing of the switch 194 and the operation of the ejecting mechanism 58 to remove the defective wiper assembly 22 from the holding fixture 35.

Figure 6C:
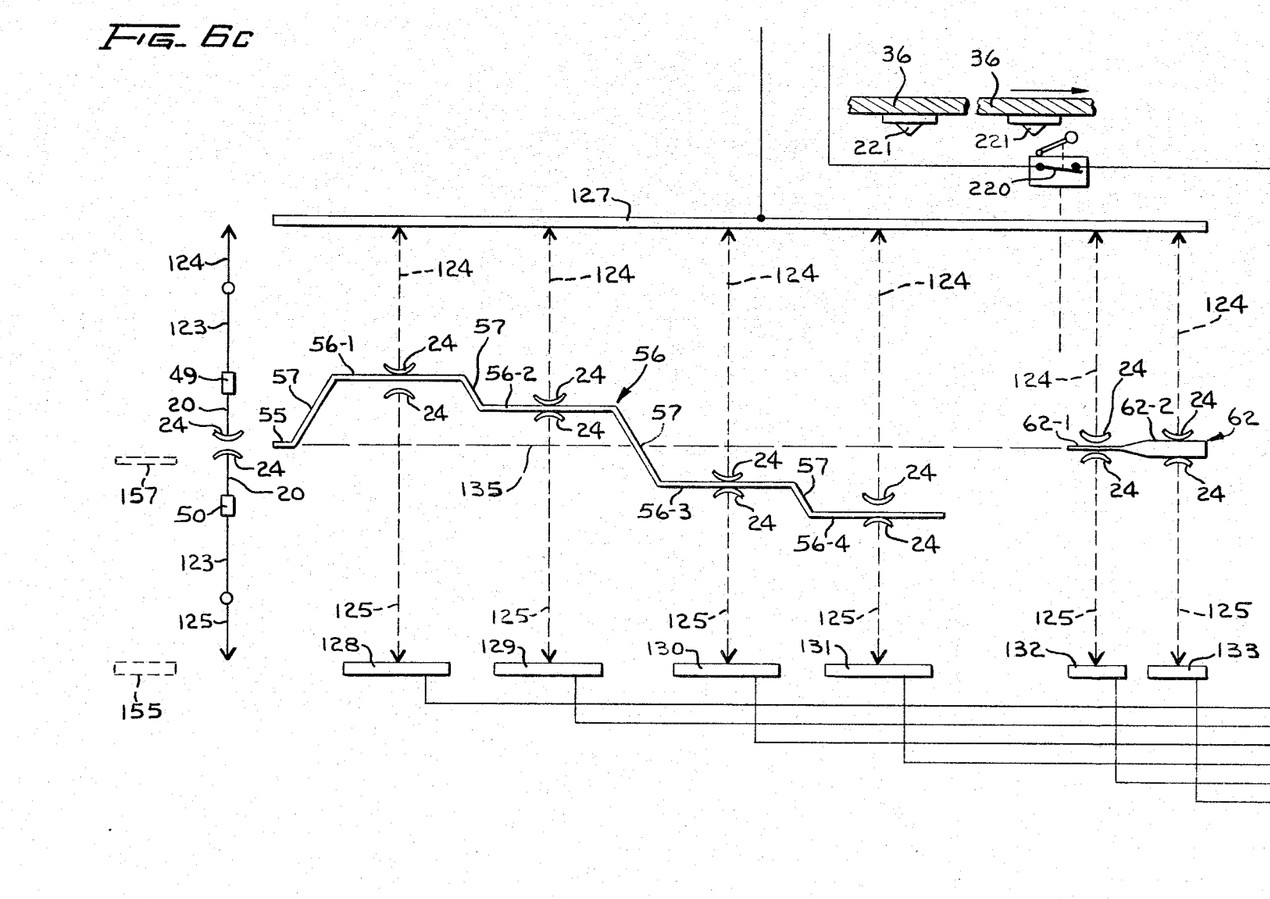
Figure 6D:
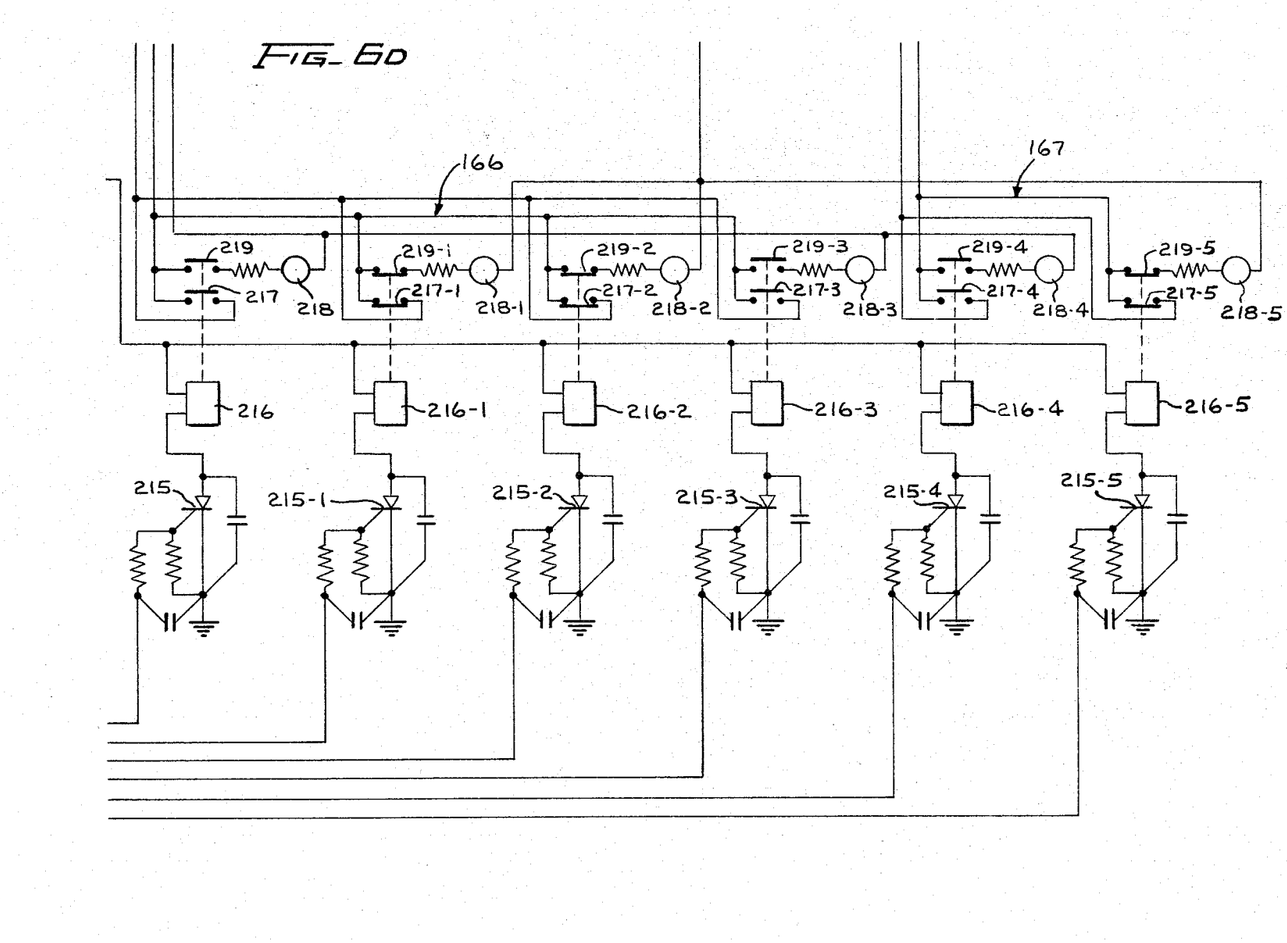
Figures 7, 11, 12:
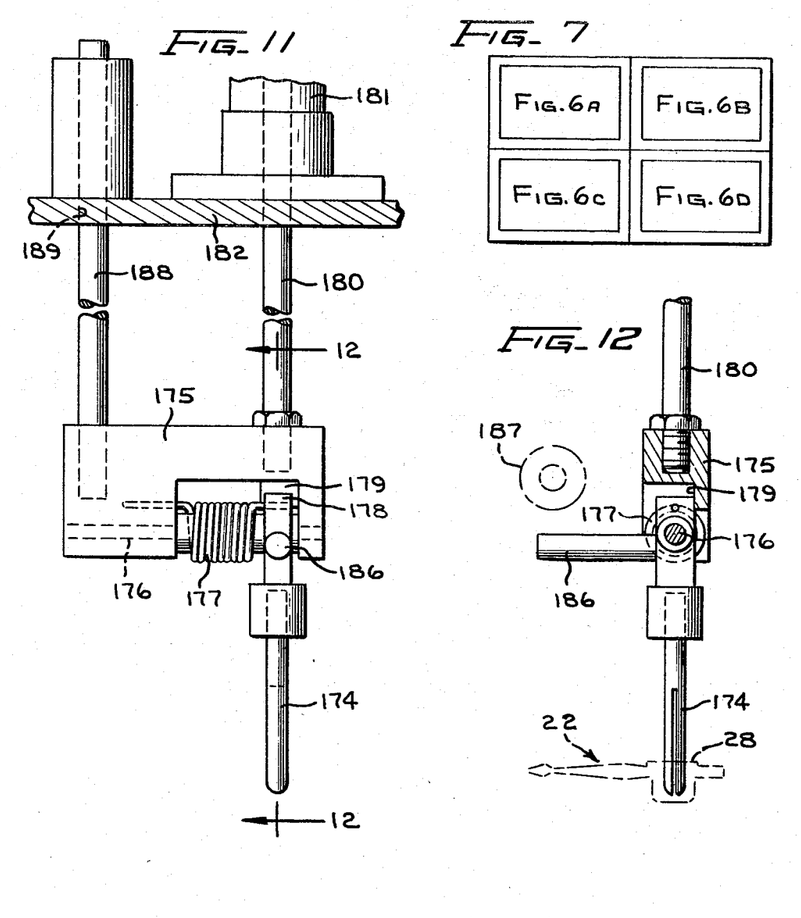
FIG. 7 is a diagram showing the arrangement of FIGS. 6a, 6b, 6c and 6d relative to one another.
FIG. 11 is a fragmentary vertical sectional view of the apparatus taken on the line 11—11 of FIG. 5 and showing the component ejecting mechanism in the lower position.
FIG. 12 is a vertical sectional view of the ejecting mechanism of the apparatus taken on the line 12—12 of FIG. 11.

As shown in FIG. 6c, a normally closed switch 220 is connected in the line from the D.C. source 210 to the silicon controlled rectifiers 215, 215–5 and is stationarily supported for actuation to open position by a series of cams 221 on the carrier 36. The cams 221, one for each holding fixture 35, are positioned on the carrier to momentarily open the switch 220 shortly after the beginning of each indexing movement of the carrier 36 to disconnect the silicon controlled rectifiers from the D.C. source 210 and thus reset them to their normal non-conductive condition.

As the holding fixture 35 is advanced from station 44, the interlocking switch 170 is opened as the cams 171 on the carrier 36 (FIG. 6b) move therefrom to disconnect the lever unclamping solenoids 165, 165–1 from the power source 150, and the stationary cam 114 engages the cam follower 111 and effects the actuation of the clamping lever 104 to its open position as the holding fixture 35 moves into the unloading station 45. Coincident with the arrival of the holding fixture 35 at the unloading station 45 one of the cams 171 actuates the interlocking switch 170 to close the contacts 170–1 and 170–2 thereof. With the closing of switch contacts 170–2 the solenoids 193 of the ejecting mechanism 58 and the solenoid 149–1 of the auxiliary drive mechanism 52 at station 45 are energized to effect the operation of the ejecting mechanism 58 to remove a wiper spring assembly 22 from the holding fixture 35 in the event that one is present therein.

With the actuation of the auxiliary drive mechanism 52 at the station 45, the motor 53 and clutch disc 141 are advanced into driving engagement with the holding adjusting mechanism 51 which then operates to rotate the screw shaft 95 in the reverse direction and elevate the holder 46 from its lower position, in which it intercepts the light bam 204, to the normal upper position. As the holder 46 moves out of the path of the light beam 204, the light beam acts on the photosensitive element 205 and effects the energization of the photoelectric relay 195, the opening of the contacts 195–1 and 195–2 and the closing of the contacts 192–3, the stopping of the rotation of the motor 53, and the return of the motor to its normal retracted position.

During the following indexing movement of the carrier 36, the holding fixture 35 with the holder 46 thereof in its upper position is advanced to the loading station 41 preparatory to the initiation of another cycle of operation.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. Apparatus for testing the tension of a wiper spring of an electrical component in which a pair of wiper springs are supported in opposed relation to one another, which comprises:

means for supporting the component;

a conductive gaging element;

means for effecting relative movement between the gaging element and the component supporting means to flex one of the springs from the other to a testing position; and means including a circuit adapted to be completed through the springs and said gaging element at said testing position for indicating that the other spring has engaged or has not engaged, respectively, the gaging element at said testing position.

2. Apparatus for testing the tension of a pair of opposed wiper springs of an electrical component, which comprises:
   means for supporting the component;
   a conductive gaging element;
   means for effecting relative movement between the gaging element and the component supporting means to flex the springs individually from the other spring to a plurality of testing positions;
   means including circuit means individual to said testing positions adapted to be completed through the springs and said gaging element for indicating that both springs have engaged or have not engaged, respectively, the gaging element at said testing positions; and
   means for connecting said circuit means individually to said springs in timed relation to the movement of the springs to said testing positions.

3. In an apparatus for testing a condition of a pair of wiper springs of an electrical component in which the springs are supported in insulated and spaced relation to one another, the combination of:
   means for supporting such a component with the springs disposed in predetermined positions on opposite sides of a plane;
   an elongated electrically conductive gaging element engageable with and between the springs and provided with a testing section in a predetermined position and in parallel relation to the plane and having a sloping portion for guiding a spring thereonto;
   means for effecting relative movement between said component supporting means and said gaging element along a path parallel to the plane to effect the engagement of one or both of the springs with said testing section;
   means for indicating the condition of the spring being tested; and
   means including a normally open circuit adapted to be closed through the springs in response to the engagement of both of the springs with the testing section for actuating said indicating means:

4. In an apparatus for testing a condition of a pair of wiper springs of an electrical component in which the springs are supported in insulated and spaced relation to each other, the combination of:
   means for supporting such a component with the springs disposed on opposite sides of a plane;
   means for advancing the supporting means parallel to the plane;
   an elongated electrically conductive gaging element mounted in insulated relation in the path of movement of the spring and engageable with and between the springs and having a testing section disposed in parallel relation to the plane and having a sloping portion for guiding one of the springs onto said testing section;
   indicating means; and
   means including a normally open circuit adapted to be closed through the springs and said gaging element in response to engagement of both of the springs with said testing section for actuating said indicating means from one condition to another.

5. In an apparatus for testing the tension of a spring of an electrical component in which a pair of the springs are supported in insulated and spaced relation to each other and with the opposed portions at one end of the springs pretensioned for movement toward each other, the combination of:
   a holder for supporting such a component with the springs disposed in predetermined positions on opposite sides of a plane;
   an elongated electrically conductive gaging element having a testing section in parallel and a predetermined laterally spaced relation to the plane and having a sloping portion for guiding one of the springs onto said testing section;
   means for effecting relative movement between said holder and said gaging element along a path parallel to the plane to effect the movement laterally of the one spring away from the other spring and onto said testing section and permitting the flexing of the other spring toward said testing section;
   indicating means; and
   means including a normally open circuit adapted to be closed through the springs and said gaging element for actuating said indicating means in response to the flexing of the other spring into engagement with said gaging element.

6. In an apparatus for testing the tension of a spring of an electrical component in which a pair of the springs are supported in insulated and spaced relation to each other and with the opposed portions at one end of the springs pretensioned for movement toward each other, the combination of:
   a holder for supporting such a component with the springs disposed in pretedmined positions on opposite sides of a plane;
   means for moving said holder along a path parallel to the plane;
   an electrically conductive gaging element fixedly mounted in parallel and spaced relation to the plane and adjacent to the path of travel of said holder for engagement with the springs of the component in said holder;
   means extending obliquely from said gaging element for guiding one of the springs onto said gaging element; and
   means for indicating the flexing of the other spring into engagement with said gaging element including a normally open circuit adapted to be closed through the springs and the gaging element.

7. In an apparatus for testing a condition of a pair of wiper springs of an electrical component in which the springs are supported in insulated and spaced relation to one another, the combination of:
   means for supporting such a component with the springs disposed on opposite sides of a plane;
   an elongated electrically conductive gaging element engageable with and between the springs and provided with a pair of testing sections in longitudinally spaced relation to each other and with opposed spring engaging surfaces in parallel relation to the plane and spaced different distances from the plane and having sloping portions extending between said testing sections for guiding the springs thereonto;
   means for effecting relative movement between said component supporting means and said gaging element along a path parallel to the plane to effect the engagement of the springs sequentially with said testing sections;
   indicating means individual to said testing sections;
   normally open circuits individual to said testing sections adapted to be closed through the springs in response to the engagement of both of the springs with the testing sections individually for actuating the individual indicating means associated therewith; and
   means for connecting said normally open circuits individually to said springs in timed relation to the engagement of the springs with said testing sections.

8. In an apparatus for testing the tension of a spring of an electrical component in which a pair of the springs are supported in spaced and insulated relation to each other and with the opposed portions at one end of the springs pretensioned for movement toward each other, the combination of:

a holder for supporting such a component with the springs disposed in predetermined positions on opposite sides of a plane;

an elongated electrically conductive gaging element adapted to fit between the springs and having a pair of testing sections in longitudinally spaced relation to each other and in parallel relation to and at different distances from the plane and having sloping portions extending from said testing sections for guiding one of the springs onto said testing sections;

means for effecting relative movement between said holder and said gaging element along a path parallel to the plane to effect the movement of one spring laterally onto said testing sections, one of said testing sections being disposed relative to the normal position of the other spring a distance slightly greater than that of the flexing movement of the other spring having a maximum acceptable tension, the other of said testing sections being disposed relative to the normal position of the other spring a distance equal to that of the flexing movement of the other spring having a minimum acceptable tension;

means associated with said one testing section for indicating the condition of the spring being tested;

means including a normally open circuit adapted to be closed through the springs in response to the engagement of both of the springs with said one testing section for actuating said indicating means from one condition to another;

a second means associated with said other testing section for indicating the condition of the spring being tested; and means including a normally open circuit adapted to be closed through the springs in response to the engagement of both of the springs with said other testing section for actuating said second indicating means from one condition to another.

9. In an apparatus for testing the tension of a pair of springs of an electrical component in which the springs are supported in insulated and spaced relation to each other and with the opposed portions at one end of the springs pretensioned for movement toward each other, the combination of:

a holder for supporting such a component with the springs disposed on opposite sides of a plane;

an electrically conductive gaging element having a thickness slightly greater than the prescribed distance between the springs and engageable with and between the springs and having a pair of testing sections in longitudinally spaced relation to each other and in parallel and spaced relation to the plane and on opposite sides thereof and having sloping portions for guiding the springs individually in opposite direactions onto one of said testing sections;

means for effecting relative movement between said holder and said testing element along a path parallel to the plane to effect the movement laterally of the springs individually onto said testing sections;

means individual to said testing sections for indicating a condition of the springs being tested;

normally open circuit means individual to said indicating means adapted to be closed through the springs in response to the engagement of both springs with said testing sections; and means for electrically connecting said circuit means to the springs in timed relation to the engagement of the springs with said testing sections.

10. In an apparatus for testing the tension of pretensioned springs of a component in which a pair of the springs are disposed in spaced and insulated relation to each other and with the opposed portions at one end of the springs pretensioned for movement toward each other, the combination of:

a holder for supporting such a component with the springs disposed on opposite sides of a plane and for movement along a path parallel to the plane;

an elongated electrically conductive gaging element mounted adjacent to the path of said holder and having a thickness slightly greater than the prescribed distance between the springs and engageable with and between the springs and having a plurality of testing sections in longitudinally spaced relation to one another and in parallel relation to one another and in parallel relation to the plane and spaced predetermined different distances from and on opposite sides of said plane, and having sloping portions for guiding the springs individually laterally from the other spring onto and from said testing sections;

means for moving said holder to effect the engagement of the springs successively with said testing sections and the lateral movement of the springs individually to predetermined positions;

indicating means individual to said testing sections;

normally open circuit means individual to said indicating means and adapted to be closed through the springs in response to the engagement of both springs with said testing sections for effecting the actuation of said indicating means; and means for connecting said circuit means sequentially to the springs in timed relation to the movement of said holder and the engagement of the springs with said testings sections.

11. In an apparatus for testing the spacing of a pair of springs of an electrical component in which the springs are supported in insulated and a prescribed spaced relation to each other, the combination of:

a holder for supporting the component;

an elongated gaging element having first and second testing sections disposed longitudinally thereof of a lesser and of a greater thickness respectively than the prescribed distance between the springs;

means for effecting relative movement between said holder and said gaging element to bring sequentially said first and said second testing sections of said gaging element between the springs;

means individual to said testing sections for indicating the condition of the spring being tested;

normally open circuit means individual to said indicating means and adapted to be closed in response to the engagement of both of the springs with said testing sections individually for changing said indicating means individually from one condition to another; and means for connecting said circuit means sequentially to the springs in timed relation to the engagement of one of the springs with said testing sections.

12. In an apparatus for testing a pair of springs of an electrical component in which the springs are supported in spaced and insulated relation to each other, the combination of:

a holder for supporting an electrical component with the springs disposed on opposite sides of a plane;

means for moving said holder parallel to said plane from a first station to a second station;

means at the second station for ejecting the component from said holder;

an electrically conductive gaging element fixedly mounted between the first and the second stations in the path of movement of the springs and having a testings section disposed parallel to and in a predetermined relation to the plane and having a sloping portion for guiding the spring onto the testing section; and means including a normally open circuit electrically connectible to the springs as the spring is moved onto said testing section and adapted to be closed through the springs in response to the engagement of both springs with said testing section for rendering said ejecting mechanism operative to remove the component from said holder.

17

13. In an apparatus for testing a pair of wiper springs of an electrical component in which the springs are supported in insulated and spaced relation to each other, the combination of:
- a holder for supporting such a component with the springs disposed on opposite sides of a plane;
- means for advancing the holder parallel to the plane from a first station to a second station;
- an elongated electrically conductive gaging element mounted in insulated relation between the stations in the path of movement of the springs and engageable with and between the springs and having a testings section parallel to and in a predetermined position relative to the plane and having a sloping portion for guiding one of the springs onto said testing section;
- ejecting means at the second station for removing the component from the holder;
- means for rendering said ejecting means operative including a circuit having a normally open first switch actuatable to a closed condition in response to movement of said holder to the second station and a normally open second switch associated with said testing section; and
- means including a normally open auxiliary circuit adapted to be completed through the springs and said gaging element for closing said second switch in response to the engagement of both of the springs with said testing section.

14. In an apparatus for testing the tension of a pair of wiper springs of an electrical component in which springs are supported in insulated and a prescribed spaced relation to each other and with the opposed portions at one end of the springs pretensioned for movement toward each other, the combination of:
- a holder for supporting such a component with the springs disposed on opposite sides of a plane;
- means for advancing the holder parallel to the plane from a first station to a second station;
- an elongated electrically conductive gaging element of a thickness slightly greater than the prescribed distance between the springs mounted fixedly between the stations in the path of movement of the springs and engageable with and between the springs and having a pair of longitudinally spaced testing sections in parallel relation to the plane and spaced predetermined different distances therefrom and having sloping portions for guiding the springs onto the testing sections;
- ejecting means at the second station for removing the component from said holder;
- control means for rendering said ejecting means operative including a normally open first switch movable to a closed condition in response to movement of said holder to the second station, a second switch associated with one of said testing sections having a normal open condition, and a third switch associated with the other of said testing sections having a normal closed condition;
- normally open auxiliary circuits individual to said testing sections and adapted to be closed through the springs and said gaging element in response to the engagement of both of said springs with said sections individually for changing said second and said third switches individually from said normal condition to a second condition; and
- means for connecting said auxiliary circuits individually to the springs in timed relation to the movement of said holder and the engagement of the springs with said testing sections.

15. In an apparatus for testing the tension of a pair of pretensioned springs of an electrical component in which the springs are supported in spaced and insulated relation to each other, the combination of:
- a holder for supporting such a component with the springs disposed equidistant and on opposite sides of a plane;
- means for moving said holder along a predetermined path parallel to the plane from a first station to a second station;
- means at the second station for ejecting defective components from said holder;
- an elongated electrically conductive gaging element fixedly mounted between the first and the second stations in the path of movement of the springs and having a thickness slightly greater than the prescribed distance between the springs and engageable with and between the springs, and having a plurality of testing sections in longitudinally spaced relation to one another and in parallel relation to the plane and spaced predetermined different distances from and on opposite sides of the plane and having sloping portions for guiding the springs onto one of said testing sections and from one testing section to another during the movement of said holder with the component from the first station to the second station;
- means for rendering said ejecting means operable including a control circuit having a normally open first switch actuatable to a closed condition in response to the movement of said holder to the second station and a plurality of second switches individual to said testing sections of said gaging element with selected ones of said second switches having a normal open condition and the others having a normal closed condition;
- normally open auxiliary circuits individual to said second switches of said control circuit and connectible to the springs and adapted to be closed therethrough in response to the engagement of both of the springs with said testing sections individually to effect the closing of said second switches individually; and
- means for electrically connecting said auxiliary circuits individually to the springs in timed relation to the movement of the holder and the engagement of the springs with said testing sections.

16. In an apparatus for testing a pair of springs of an apertured electrical component in which the springs are supported in spaced and insulated relation to each other, the combination of:
- a holder for supporting an electrical component with the springs disposed on opposite sides of a horizontal plane;
- means for moving said holder parallel to said plane from a first station to a second station;
- an electrically conductive gaging element fixedly mounted between the first and the second stations in the path of movement of the springs and having a testing section disposed parallel to and in a predetermined relation to the plane and having a portion sloping therefrom for guiding a spring onto the testing section;
- an actuator mounted at the second station and having a vertically reciprocable piston;
- a pickup finger provided with a slotted end portion mounted on said piston for pivotal movement to and from a vertical position in alignment with the apertured component and for vertical movement with the piston into the aperture of the component to grip the component and to withdraw the component from the holder in response to upward movement of the piston;
- a stationary stripper member mounted adjacent the path of movement of the pickup finger;
- means responsive to an intermediate portion of the upward movement of said pickup finger for pivoting said finger laterally toward the stripper member for engagement of the component with said stripper member to effect the stripping of the component from said finger;

means for effecting the operation of said actuator including a circuit having a normally open switch actuatable to a closed condition in response to movement of said holder to the second station and a normally open second switch associated with said testing section of said gaging element; and means including a normally open auxiliary circuit adapted to be completed through the springs in response to the engagement of both of the springs with said testing section for closing said second switch.

17. In an apparatus for testing a pair of springs of an electrical component in which the springs are supported in insulated and spaced relation to each other, the combination of:

a carrier;

a holder for such a component mounted on said carrier for horizontal movement therewith to a plurality of stations and for vertical movement on the carrier to a normal upper position for receiving the component therein at a first station;

means including a gaging element fixedly mounted between a second station and a third station for testing the springs in response to movement of said holder from the second station to the third station, said gaging element being engageable with and between the springs and having a leading end disposed at a predetermined elevation;

means responsive to the movement of said holder to the second station for effecting a downward movement of said holder and the component therein;

a positioning element mounted fixedly at the second station in the path of movement of the lower spring of the component and in advance of and in a predetermined vertical relation to the leading end of said gaging element;

control means including a circuit connected to the lower spring and to the positioning element and adapted to be completed therethrough in response to the movement of the lower spring into engagement with the positioning element for arresting the downward movement of said holder with the springs in a predetermined vertical relation to said end of said gaging element; and means at a subsequent station for effecting the movement of said holder to the normal upper position.

18. In an apparatus for testing a pair of springs of an electrical component in which the springs are supported in insulated and spaced relation to each other, the combination of:

a holder for supporting such a component;

a carrier;

adjustable means on said carrier for supporting said holder for movement with said carrier and for vertical movement relative thereto;

means for indexing said carrier to advance said holder and the component therein to a plurality of stations, said holder having a normal upper position at a first station for receiving the component therein;

means including a gaging element fixedly mounted between a second station and a third station for testing the springs in response to movement of said holder from the second station to the third station, said gaging element being engageable with and between the springs and having a leading end portion thereof disposed at a predetermined elevation;

drive means at said second station for actuating said adjustable means in one direction to lower said holder;

means responsive to the movement of said holder to the second station for rendering said drive means operative to effect the actuation of said adjustable means and the downward movement of said holder and the component herein;

a positioning element mounted fixedly at the second station in the path of downward movement of the lower spring of the component and at a predetermined position vertically with respect to and in advance of said gaging element;

control means including a circuit adapted to be completed through the lower spring of the component and said positioning element in response to the movement of the lower spring into engagement with said positioning element for rendering said drive means unoperative to effect the stopping of said holder in a position to support the component with the gap between the springs in horizontal alignment with said end of said gaging element; and means at a subsequent station for effecting the return of said holder to the normal upper position on said carrier.

19. In an apparatus for testing a pair of springs of an electrical component in which the springs are supported in insulated and spaced relation to each other, the combination of:

a carrier;

a holder on said carrier for supporting a component for movement therewith;

adjustable means on said carrier for moving said holder vertically;

means for indexing said carrier to advance said holder and the component therein to a plurality of stations, said holder having a normal upper position at a first station for receiving the component therein;

means including a gaging element fixedly mounted between a second station and a third station for testing the springs in response to movement of said holder from the second station to the third station, said gaging element being engageable with and between the springs and having a leading end portion thereof disposed at a predetermined elevation;

drive means at the second station for actuating said adjustable means in one direction to lower said holder;

means responsive to the movement of said holder to the second station for rendering said drive means operative to effect the actuation of said adjustable means and the downward movement of said holder and the component therein;

a positioning element mounted fixedly at the second station in the path of downward movement of the lower spring of the component and at a predetermined position vertically with respect to and in advance of said gaging element;

control means including a circuit adapted to be completed through the lower spring of the component and said positioning element in response to the movement of the lower spring into engagement with said positioning element for rendering said drive means unoperative and to effect the stopping of said holder in a position to support the component with the gap between the springs in horizontal alignment with said end of said gaging element;

a second drive means at a subsequent station for actuating said adjustable means in a reverse direction to raise said holder;

means responsive to the movement of said holder to the subsequent station for rendering said second drive means operative to effect the actuation of said adjustable means and the upward movement of said holder; and means responsive to the movement of said holder to the normal upper position for rendering said second drive means unoperative.

20. In an apparatus for testing a pair of springs of an electrical component in which the springs are supported in insulated and spaced relation to each other, the combination of:

a carrier;

a holder on said carrier for supporting a component for movement therewith;

adjustable means on said carrier for moving said holder vertically to different levels;

means for indexing said carrier to advance said holder and the component therein to a plurality of stations, said holder having a normal upper position at a first station for receiving the component therein;

means including a gaging element fixedly mounted between a second station and a third station for testing the springs in response to movement of said holder from the second station to the third station, said gaging element being engageable with and between the springs and having a leading end portion thereof disposed at a predetermined elevation;

drive means including a motor mounted at the second station for movement from a normal retracted position disengaged from said adjustable means to a forward position in engagement with said adjustable means for actuating said adjustable means in one direction to lower said holder;

actuating means for moving said drive means to and from said retracted and advanced positions;

control means responsive to the movement of said holder to the second station for starting said motor and operating said actuator to effect the movement of said drive means to the advanced position and the downward movement of said holder;

a positioning element mounted at the second station in the path of downward movement of the lower spring of the component and at a predetermined position vertically with respect to said gaging element; and control means including a circuit adapted to be completed through the lower spring of the component and said positioning element in response to the movement of the lower spring into engagement with said positioning element for stopping said motor and operating said actuator to effect the disengagement of the drive means from said adjustable means and the stopping of said holder with the springs in a predetermined position relative to said end of said gaging element.

References Cited by the Examiner

UNITED STATES PATENTS

| | | | |
|---|---|---|---|
| 2,567,741 | 9/1951 | Smith | 209—81 |
| 2,573,488 | 10/1951 | Raetsch et al. | 73—161 |
| 2,695,099 | 11/1954 | Foust et al. | 209—81 |
| 2,728,994 | 1/1956 | McCarthy | 324—158 |
| 2,855,017 | 10/1958 | Pollard | 73—161 X |
| 2,940,036 | 6/1960 | Weeks | 324—28 |

M. HENSON WOOD, Jr., *Primary Examiner.*

A. N. KNOWLES, *Assistant Examiner.*